United States Patent
Møller et al.

(10) Patent No.: US 6,915,751 B1
(45) Date of Patent: Jul. 12, 2005

(54) METHOD AND APPARATUS FOR PROCESSING A PULVERULENT OR PARTICULATE MATERIAL

(75) Inventors: Jens Thousig Møller, Allerød (DK); Uffe Christiansen, deceased, late of Birkerød (DK); by Carmen Estrem Tjørnelund, legal representative, Birkerød (DK)

(73) Assignee: Niro A/S, (DK)

( * ) Notice: Subject to any disclaimer, the term of this patent is extended or adjusted under 35 U.S.C. 154(b) by 0 days.

(21) Appl. No.: 10/203,272

(22) PCT Filed: Feb. 18, 2000

(86) PCT No.: PCT/DK00/00066

§ 371 (c)(1),
(2), (4) Date: Jul. 23, 2003

(87) PCT Pub. No.: WO01/60509

PCT Pub. Date: Aug. 23, 2001

(51) Int. Cl.[7] .............................. F23B 7/00; F23G 5/30
(52) U.S. Cl. ..................... 110/343; 110/348; 110/243; 110/245
(58) Field of Search .......................... 34/323, 460, 654, 34/582, 583, 585; 110/245; 165/104.16; 201/31; 422/146, 143, 139; 427/213

(56) References Cited

U.S. PATENT DOCUMENTS

| | | | |
|---|---|---|---|
| 1,739,594 A | * | 12/1929 | Jackson ...................... 110/343 |
| 3,877,440 A | * | 4/1975 | Winkin ................... 122/235.13 |
| 4,205,456 A | | 6/1980 | Ayers et al. |
| 4,492,040 A | | 1/1985 | Jensen et al. |
| 4,548,138 A | | 10/1985 | Korenberg |
| 5,230,868 A | * | 7/1993 | Engstrom .................... 422/143 |
| 5,568,834 A | * | 10/1996 | Korenberg ............. 165/104.16 |
| 5,809,913 A | * | 9/1998 | Kramer et al. .............. 110/347 |
| 6,352,041 B1 | * | 3/2002 | Lin et al. ..................... 110/341 |

FOREIGN PATENT DOCUMENTS

| | | | | |
|---|---|---|---|---|
| EP | 0173261 A2 | 3/1986 | | |
| EP | 0441092 A1 | 2/1990 | | |
| EP | 0474949 B1 | 11/1994 | | |
| EP | 0430849 B1 | 7/1995 | | |
| WO | WO96/02792 | * | 1/1996 | ........... F22B 31/00 |

* cited by examiner

Primary Examiner—Kenneth Rinehart
(74) Attorney, Agent, or Firm—Sughrue Mion, PLLC

(57) ABSTRACT

In a fluid bed apparatus in which a layer of pulverulent or particulate material is fluidized by means of fluidizing gas which is introduced through openings in a bed plate in a first plurality of streams of flows of gas, means are provided for introducing a second plurality of streams of flows of gas at a site or sites of introduction and is directed from said site or sites along the surfaces of at least some of the walls of the housing to form a gas barrier covering at least a substantial part of said wall surfaces and the ceiling of the housing thus reducing detrimental effects, in particular deposition of products, condensation and corrosion, on the surfaces of the walls and ceiling of the housing.

16 Claims, 2 Drawing Sheets

METHOD AND APPARATUS FOR PROCESSING A PULVERULENT OR PARTICULATE MATERIAL

FIELD OF THE INVENTION

The present invention relates to a method and apparatus for processing a layer of pulverulent or particulate material which is fluidized on a bed plate of a fluid bed apparatus by means of fluidizing gas which is introduced through openings in the bed plate in a first plurality of streams or flows of gas, said fluid bed apparatus comprising a housing having a mainly polygonal shape and comprising a number of walls and a ceiling, said method further comprising a reduction of detrimental effects, in particular deposition of products, condensation and corrosion, on the surfaces of said walls and ceiling.

BACKGROUND OF THE INVENTION

In the area of fluid bed technology it is a well-known problem that condensation is generated on the walls and the ceiling of the housing due to the high moisture content of the fluidizing gas after the passage through the layer of material to be processed in the fluid bed. It is a further problem that products may deposit on these walls.

In order to remedy these problems it is known, as eg. described in U.S. Pat. No. 4,492,040 (Niro), to provide the inner side of the housing with heating means, eg. heating panels which are heated in a suitable manner, for example by means of electric current, heated gas or air, or steam or water, in order to avoid condensation and deposition of products on the walls and ceiling of the housing.

Furthermore, it is known to direct a so-called bypass gas to the fluid bed, which is mixed with the fluidizing gas in order to obtain a gas mixture having a lower moisture content in order to avoid condensation in the discharge system of the fluid bed apparatus.

However, in fluidization processes involving materials which during the drying release corrosive vapour, such as eg. s-PVC which releases HCl, the above-mentioned measures may not be sufficient.

SUMMARY OF THE INVENTION

With this background it is an object of the present invention to provide a method and apparatus in which the above-mentioned undesirable consequences of the drying process is largely avoided.

In one aspect of the invention this object is met by a method of the initially stated kind, which is characterized in that a second plurality of streams or flows of gas is introduced into said housing at a site or sites of introduction and is directed from said site or sites along the surfaces of at least some of the walls of the housing to form a gas barrier covering at least a substantial part of said wall surfaces and the ceiling of the housing.

By forming a gas barrier which is brought to cover the parts of the housing which are subjected to the vapour deriving from the material being dried in the dryer, a good protection against contact between the moist and possibly corrosive spent fluidizing gas/product and the walls and ceiling of the fluid bed housing is obtained, thus impeding the formation of condensation and the deposition of products, and counteracting the effects of corrosive vapour, such as pitting and stress corrosion and of product degradation.

In another aspect of the invention a fluid bed apparatus is provided, said apparatus comprising a housing having a mainly polygonal shape and comprising a number of walls and a ceiling, and a bed plate on which a layer of pulverulent or particulate material is fluidized by means of fluidizing gas which is introduced through openings in the bed plate in a first plurality of streams or flows of gas, means being provided for reducing detrimental effects, in particular deposition of products, condensation and corrosion, on the surfaces of said walls and ceiling. According to the invention the fluid bed apparatus is characterized in that means are provided for introducing a second plurality of streams or flows of gas at a site or sites of introduction and is directed from said site or sites along the surfaces of at least some of the walls of the housing to form a gas barrier covering at least a substantial part of said wall surfaces and the ceiling of the housing.

Advantageous embodiments of the invention are the subject of the dependent claims.

In the following the invention will be described in further detail by means of an embodiment thereof and the appended drawings.

DESCRIPTION OF A PREFERRED EMBODIMENT

Figure 1:
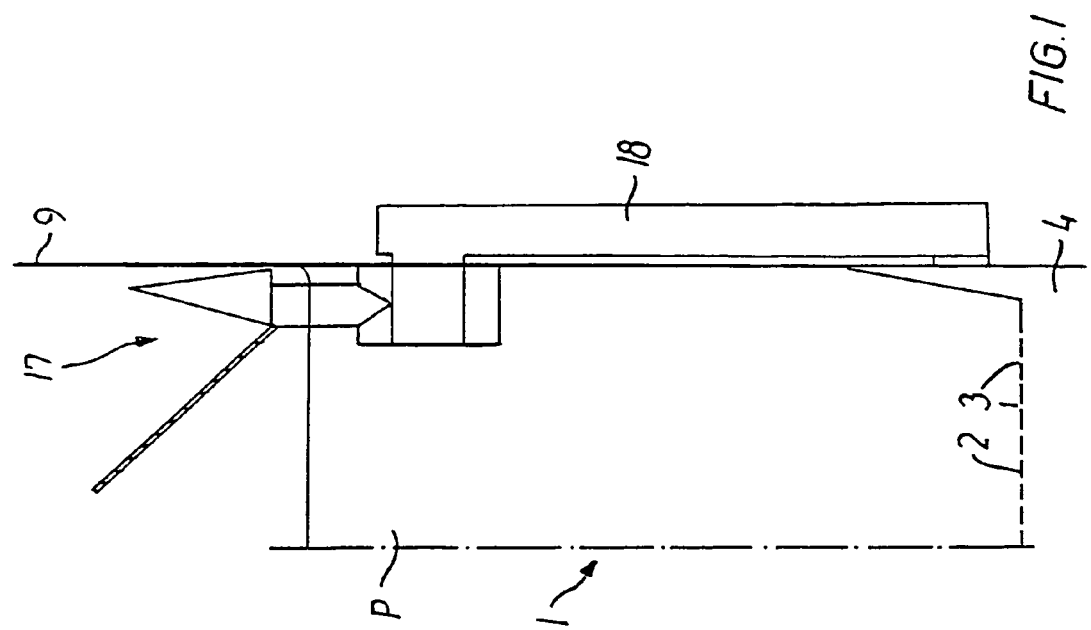
FIGS. 1 and 2 are very schematic sectional views of an embodiment of the apparatus according to the invention.
Figure 2:
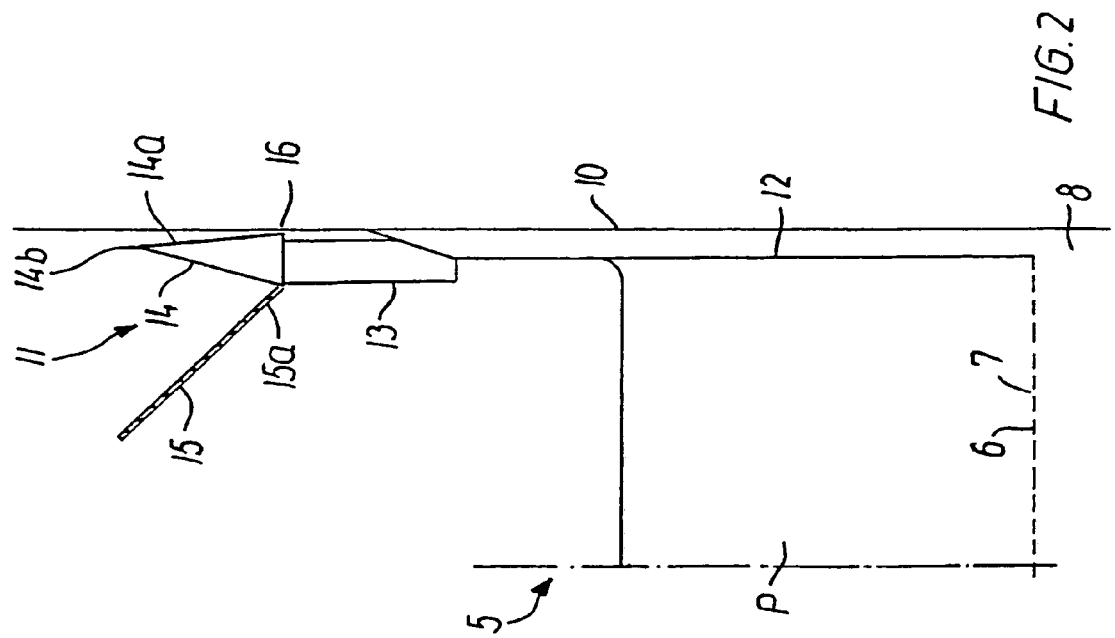

FIGS. 1 and 2 show cutout sectional views of a first 1 and a second 5 section, respectively, of a fluid bed apparatus which is used for processing a pulverulent or particulate material. Examples of such materials are dairy products, ceramics, polymers etc. which are eg. dried, cooled or spray granulated in the fluid bed apparatus. The method and apparatus according to the invention are particularly advantageous in connection with materials containing chlor, such as inorganic salts or polymers as PVC.

The first section 1 of the apparatus is in the embodiment shown of the back-mix type, in which pulverulent or particulate material is supplied by distributor means (not shown) to a fluid bed plate 2 on which the material forms a layer of material P. The height or thickness of the material depends on the type of material being processed and may be regulated by a suitable means such as a damper or an overflow valve. Fluidizing gas is introduced through openings 3 in the bed plate 2 from a plenum chamber 4 in a plurality of streams or flows of gas. The plenum chamber 4 is in a manner known per se supplied with a suitable fluidizing gas such as heated ambient air. The fluid bed plate 2 may eg. be of the type which is described in Applicant's European Patent No. 0 474 949. A number of heating panels (not shown) are preferably arranged above the bed plate 2 in this section of the fluid bed apparatus.

The second section 5 of the apparatus is of the plug flow type and has a bed plate 6 with openings 7, through which fluidizing gas is introduced from a plenum chamber 8. The second section 5 comprises a number of baffle walls (not shown) providing a serpentine path for the material. The bed plate 6 may be designed as the bed plate 2 of the first section 1 or as described in Applicant's European Patent No. 0 430 849.

The first and second sections 1 and 5 have a common housing having a mainly polygonal shape, the bed plates 2 and 6 each having a substantially polygonal or rectangular shape, and a number of walls extending perpendicularly to the bed plates, of which walls 9 and 10 are shown in FIGS. 1 and 2. At the upper end of the walls, these are connected to a ceiling (not shown) which may be substantially parallel to the bed plates, thus forming a substantially box-shaped fluid bed apparatus. However, the transition between the walls and the ceiling may be designed as an area having an oblique or rounded shape. Exhaust means (not shown) are provided at the ceiling for withdrawing spent fluidizing gas, either to the ambience after cleaning of the gas, or the gas may be recycled after going through a series of cleaning, condensing and heating processes.

In order to reduce the detrimental effects, such as deposition of products as such or in the form of fines entrained in the fluidizing gas, condensation and possibly corrosion, of the spent fluidizing gas on the walls and ceiling of the fluid bed apparatus housing, means 11 and 17 are provided in each section 5, 1 for providing a gas barrier on the walls and ceiling of the housing.

The introduction means 11 of the second section 5 will be described in further detail below.

Barrier gas is led from the plenum chamber 8 to the introduction means 11 through a passage which is formed in the hollow space between the wall 10 and an inner wall 12. Alternative barrier gas sources are of course conceivable. It is thus possible to make use of a separate plenum chamber, external supply means, the plenum chamber 4 of the first section 1 etc. At the upper end of the passage between the wall 10 and the inner wall 12, the gas is passed in a plurality of tubes 13 positioned at a distance from each other in the longitudinal direction of the wall 10. The tubes 13 are connected to a profile 14 extending in the longitudinal direction of the wall 13, ie. perpendicularly to the tubes 13. The profile 14 has on its side facing the wall 10 a plate 14a in which openings are provided, through which the barrier gas may pass. The plate 14a may be of any suitable kind, such as a perforated plate, a gill-type plate or comprise baffles, which provides for the desired velocity distribution and values.

The barrier gas is thus introduced into the inner space of the housing in a second plurality of streams or flows which are directed along the surface of the wall 10 and continues to flow along the wall 10 and the ceiling of the housing. In the embodiment shown, a protruding flange portion 14b on the profile 14 ensures that the barrier gas is directed along the wall 10. Similar introduction means may be provided on adjoining walls in order to obtain a substantially continuous gas barrier covering the wall 10, adjoining walls and the ceiling.

Alternatively, the second plurality of flows or streams forming the gas barrier may be introduced by means of nozzles giving eg. a fan-shaped distribution of jets. However, this is not as advantageous as the embodiment shown and described, as nozzles impart an unequal distribution and a higher velocity to the streams or flows of barrier gas. The barrier gas may furthermore be introduced through vertical slits at the corners of the housing, ie. at the connection between adjoining walls, which entails that the streams or flows of gas are directed substantially horizontally.

A shielding arrangement in the form of a deflecting plate 15 is secured to the profile 14. The deflecting plate 15 is intended for protecting the introduction means 11 from spouting material from the fluid bed. In addition, the deflecting plate 15 leads the fluidizing gas from the bed in a direction away from the wall 10 so that mixing between the barrier gas and fluidizing gas is diminished. An aperture 15a is provided in the deflecting plate 15 to allow spouting material which has entered above the deflecting plate 15 to return to the fluid bed. Spouting material which has entered the space between the plate 14a of the profile 14 and the wall 10 is allowed to return to the bed through a narrow gap 16 to avoid clogging of the openings in the plate 14a.

The position of the introduction means, ie. the site of introduction of the barrier gas, may be varied according to the character of the material being fluidized and the height or thickness of the material layer on the bed plate. In the second or plug flow section 5 shown in FIG. 2, the introduction means 11 are positioned well above the layer of material P on the bed plate 6. As the temperature of the barrier gas is relatively high and preferably higher than the temperature in the fluid bed, deposition of products and condensation on the part of the wall situated below the introduction means 11 is reduced by passing the barrier gas in the hollow space between the wall 10 and the inner wall 12. The temperature of the barrier gas may vary but should not, however, be so high so as to cause damage to the material being fluidized.

As shown in FIG. 1, the introduction means 17 in the first or back-mix section of the fluid bed apparatus is situated at a level only slightly above the layer of material P on the bed plate 2. The introduction means 17 may eg. be designed as the introduction means 11 of the second section 5, but the barrier gas is passed from the plenum chamber 4 to the introduction means 17 through a tube 18 positioned externally of the wall 9 of the first section 1. As described in the above, it is of course possible to use other sources of gas, and the barrier gas may also be used for heating the wall 9 below the site of introduction as in the second section of the fluid bed apparatus.

The amount of the barrier gas typically lies in the interval 2 to 25% of the total amount of gas, ie. the sum of the amounts of fluidizing gas and barrier gas, and the velocity of the barrier gas should be sufficiently low so as not to entrain the fluidizing gas, as this would reduce the effect of the gas barrier. This velocity which may typically lie in the range 0.2 to 15 times the velocity of the fluidizing gas, eg. values of the velocity being 0.1 to 5 m/s.

EXAMPLE

A flow of s-PVC is supplied to the back-mix section 1 of the fluid bed apparatus and is dried by means of fluidizing gas having a temperature of about 70° C. which is introduced through the openings 3 and 7 in the bed plates 2 and 6 of the first (back-mix) and second (plug flow) section, respectively. The temperature of the material on the bed plates 2 and 6 is slightly lower, approx. 60° C. The temperatures may be different in different parts of the fluid bed apparatus.

The velocity of the fluidizing gas is approx. 0.35 m/s in the back-mix section 1 and approx. 0.25 m/s in the plug flow section 5.

Barrier gas is introduced through the introduction means 11 and 17. The amount of barrier gas is approx. 9% of the total amount of gas.

Figure 3:
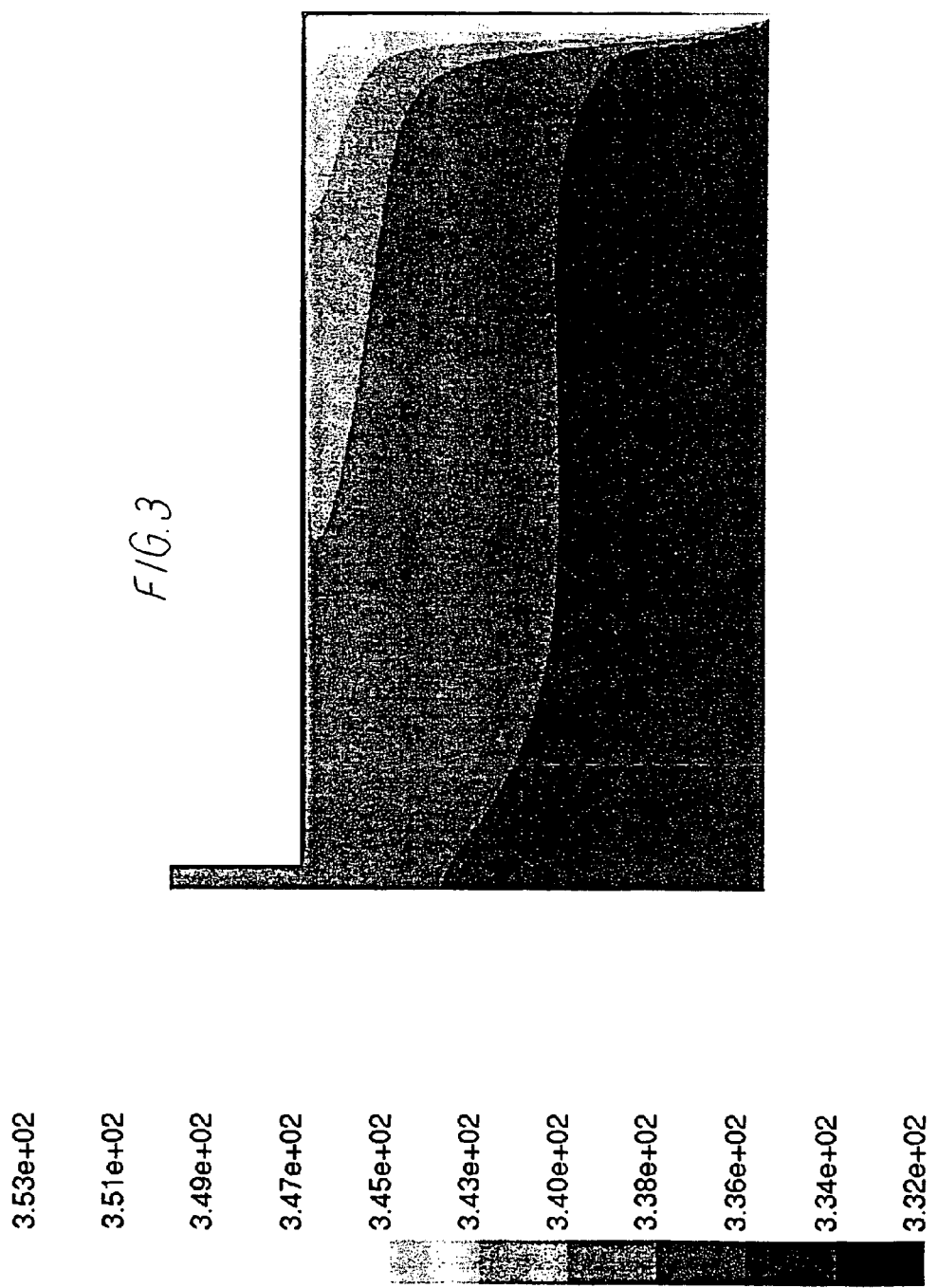
FIG. 3 is a graphic illustration of a computer-simulated example of the temperature distribution with application of the method and apparatus according to the invention.

As may be seen from the graphic illustration of FIG. 3 showing the temperature distribution in a computer-simulation using conditions corresponding to the above-mentioned and at a velocity of the barrier gas of 2 m/s, the temperature at the walls and the ceiling are increased in relation to the temperature in the fluid bed.

The invention should not be regarded as being limited to the embodiment described in the above but various modifications of the method and apparatus may be carried out without departing from the scope of the appended claims.

What is claimed is:

1. A method of processing a layer of pulverulent or particulate material which is fluidized on a bed plate of a fluid bed apparatus by means of fluidizing gas which is introduced through openings in the bed plate in a first plurality of streams or flows of gas, said fluid bed apparatus comprising a housing having a polygonal shape and comprising a number of walls and a ceiling, said method further comprising a reduction of detrimental effects in particular deposition of products, condensation and corrosion, on the surfaces of said walls and ceiling, wherein a second plurality of streams or flows of gas is introduced into said housing at a site or sites of introduction and is directed from said site or sites along the surfaces of at least some of the walls of the housing to form a gas barrier covering at least a substantial part of said wall surfaces above said bed plate and the ceiling of the housing, the temperature of said second plurality of streams or flows of gas being higher than the temperature of the layer of material.

2. A method according to claim 1, wherein said second plurality of streams or flows of gas has a first flow component directed upwardly form said site or sites of introduction and/or a second flow component at right angles to said first flow component.

3. A method according to claim 1, wherein said site or sites of introduction is/are situated at a level above the layer of material on the plate.

4. A method according to claim 1, wherein the velocity of the streams or flows or gas of said second plurality is sufficiently low so as not to entrain said fluidizing gas.

5. A method according to claim 1, wherein the amount of said second plurality of streams or flows of gas is 2–25% of the total amount of gas.

6. A method according to claim 1, wherein said second plurality of streams or flows of gas is utilized for heating said wall or walls below the site or sited of introduction.

7. A method according to claim 1, in which said a fluid bed apparatus comprises a first fluid bed section of the back-mix flow type and a second fluid bed section of the plug flow type, wherein said second plurality of streams or flows of gas is utilized for heating said wall or walls below the site or sites of introduction in at least one of said sections.

8. A fluid bed apparatus comprising a housing having a polygonal shape and comprising a number of walls and a ceiling, and a bed plate on which a layer of pulverulent or particulate material is fluidized by means of fluidizing gas which is introduced through openings in the bed plate in a first plurality of streams or flows of gas, means being provided for reducing detrimental effects, in particular deposition of products, condensation and corrosion, on the faces of said walls and ceiling, wherein means are provided for introducing a second plurality of streams or flows of gas at a site or sites of introduction and is directed from said site or sites along the surfaces of at least some of the walls of the housing to form a gas barrier covering at least a substantial part of said wall surfaces above said bed plate and the ceiling of the housing, said introduction means comprising a profile extending in the longitudinal direction of the wall or at least one nozzle at each site of introduction.

9. A fluid bed apparatus according to claim 8, wherein said introduction means are designed to impart to said second plurality of streams of flows of gas a first flow component directed upwardly from the introduction means and/or a second flow component at right angles to said first flow component.

10. A fluid bed apparatus according to claim 8, wherein said introduction means are situated at a level above the layer of material on the bed plate.

11. A fluid bed apparatus according to claim 8, wherein said introduction means are designed as openings in the wall.

12. A fluid bed apparatus according to claim 8, wherein a shield arrangement is provided at the site or sites of introduction for deflecting spouting material from the fluid bed from the introduction means.

13. A fluid bed apparatus according to claim 12, wherein an aperture is provided in said shielding arrangement for permitting spouting material to return to the fluid bed.

14. A fluid bed apparatus according to claim 8, wherein said wall or walls is/are hollow in part or in full to conduct at least said second plurality of streams or flows of gas.

15. A fluid bed apparatus according to claim 14, wherein said second plurality of streams or flows of gas is utilized for heating said wall or walls.

16. A fluid bed apparatus according to claim 8, comprising a first fluid bed section of the back-mix flow type and a second fluid bed section of the plug flow type, wherein said second plurality of streams or flows of gas is utilized for heating said wall or walls in at least one of said sections.

* * * * *